Sept. 6, 1966    M. A. ROSENFELD ETAL    3,271,564
DIGITAL MEASURING APPARATUS

Filed June 18, 1962    2 Sheets-Sheet 1

INVENTORS
MELVIN A. ROSENFELD
BY ROBERT G. MOYER

ATTORNEY

INVENTORS
MELVIN A. ROSENFELD
BY ROBERT G. MOYER

ATTORNEY (United States Patent Office)

3,271,564
DIGITAL MEASURING APPARATUS
Melvin A. Rosenfeld, Barrington, and Robert G. Moyer, Crystal Lake, Ill., assignors, by mesne assignments, to Union Oil Company of California, Los Angeles, Calif., a corporation of California
Filed June 18, 1962, Ser. No. 203,269
20 Claims. (Cl. 235—151.32)

This invention relates to measuring devices and, more particularly, to a small measurement digitizer, an X–Y reader, and a polar-coordinate map reader.

Measurements of short distances are made for various purposes in the work connected with many sciences. Frequently, it is necessary to measure a large number of short distances or the sizes of small particles for various purposes. For example, the peak heights on graphical records, such as those obtained in the logging of oil wells, must be determined and compiled for statistical and other mathematical purposes in geological work. Also, determining the sizes of particles in samples of clays, rocks, etc., and statistically analyzing the distribution of particle sizes, is a common technique for characterizing rock formations in geological studies.

It is also frequently necessary to measure the coordinates of points in the plane of a map in order to define location, determine distances between points, read values of some property, such as elevation at points, etc. For example, in the fitting of mathematical equations to map surfaces such as planes, quadratic surfaces, cubic surfaces, etc., and determining the residual anomalies from the surfaces, the locations of many points on the map and the data at those points is needed. In geology and oil exploration such data might be magnetic, gravity, geologic structure elevations, and others. Examples of fields other than earth sciences that also use "maps" of many points are 3-dimensional yield diagrams of chemical processes, plots of engine efficiency as related to engine speed and load, and the like.

Various types of equipment have been provided in the past for measuring large numbers of short distances and/or sizes of large numbers of small objects in a limited field and for reading the locations of points on maps, but they have been expensive, cumbersome, tedious to use, and otherwise deficient.

In accordance with this invention, we have devised simple and relatively inexpensive apparatus for making and recording such measurements. For each measurement made, the devices of this invention provide discrete records which are suitable for many different types of mathematical analysis, and provide unlimited flexibility in such analysis.

Accordingly, it is the primary object of this invention to provide novel measuring devices. Another object of this invention is to provide measuring devices which are readily portable and extremely easy to use. Still another object of this invention is to provide measuring devices which give a discrete indication of each measurement made. A further object of this invention is to provide a small measurement digitizer, an X–Y reader, and a polar coordinate map reader. These and further objects of this invention will become apparent or be described as the description herein proceeds and reference is made to the accompanying drawings in which:

Briefly, the small measurement digitizer includes a binary digital encoder having a rotatable shaft and actuated by the rotation thereof, the shaft being spring-biased toward a zero rotational position with respect to the encoder; a tape or wire wound on a reel affixed to the rotatable shaft of the encoder such that the shaft is rotated within the encoder when the tape or wire is pulled from the reel or allowed to rewind on it; and electrical means connected to the encoder to convert the output thereof into a distance measurement. Although the electrical means connected to the encoder may merely indicate the measurement made, it preferably includes an apparatus for recording the measurement made on a punch card, paper tape, magnetic tape, etc. Optionally, the recorder is provided with means for manually imprinting identification information on the recorded output. The X–Y reader comprises two of the small measurement digitizers in combination, the second digitizer being secured to the end of the tape or wire of the first digitizer such that the tape or wire of the second digitizer is extended in a direction perpendicular to the direction of the tape or wire of the first digitizer.

Our digitizer and X–Y reader are especially well suited to the making of a large number of measurements within a small, limited area, such as a photograph, a microscope projection, a recorder chart, a map, and the like. They are superior to any prior art devices for this purpose in that they are versatile, readily portable (except for associated equipment to convert the outputs of the encoders into distance measurements), and extremely easy to use. More specifically, our devices are superior to conventional prior art curve-scaling devices because the curve can be in any position; the paper or recorder chart does not have to be carefully orientated in a fixed apparatus, as has been necessary in the past. They are superior to some other prior art measurement devices because they provide records of individual measurements rather than group data. Other advantages will be apparent.

Figure 1:
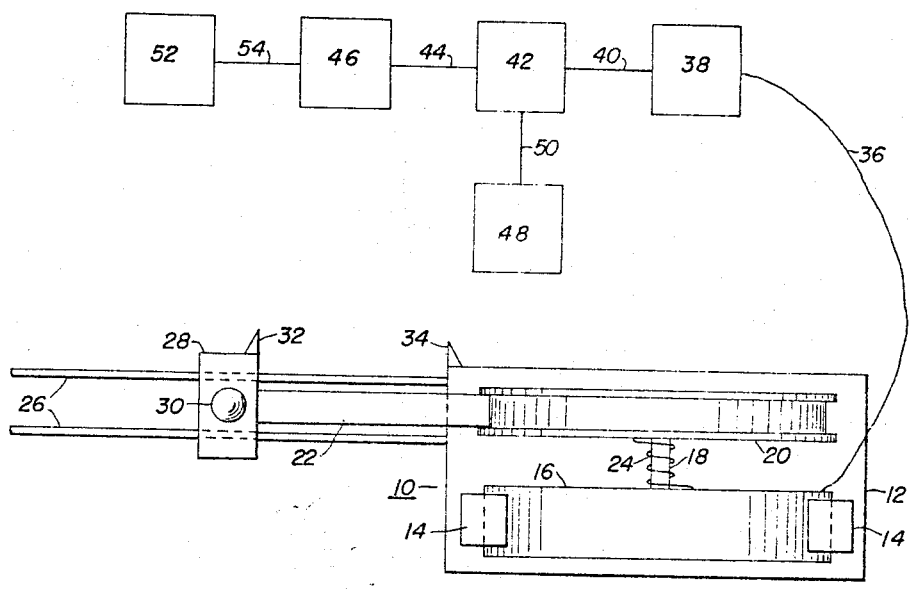
FIGURE 1 is a plan view of the small measurement digitizer in connection with a schematic circuit diagram of apparatus for recording measurements made.
Figure 2:
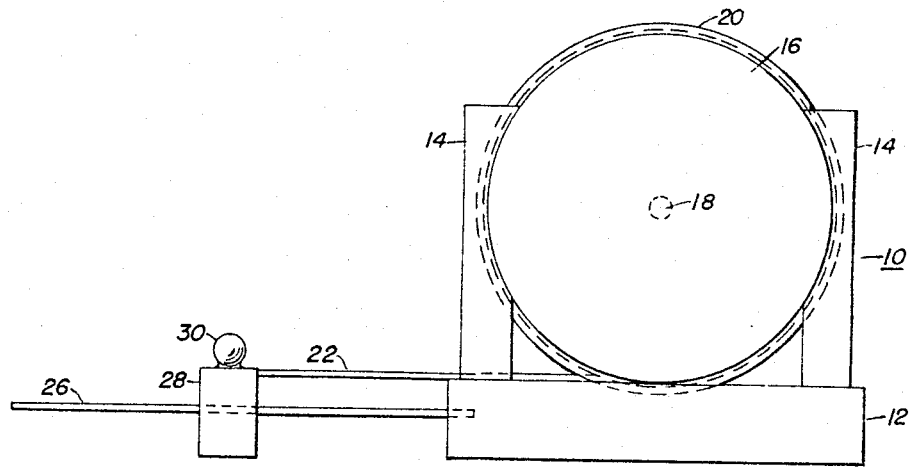
FIGURE 2 is a side view of the small measurement digitizer shown in FIGURE 1.

This invention is thus understood by reference to the accompanying drawings in which like numerals of reference designate corresponding components in each of the several figures. Referring to FIGURES 1 and 2, the numeral 10 represents the small measurement digitizer. Small measurement digitizer 10 includes base 12 to which brackets 14, which hold binary digital encoder 16 in place, are secured. Encoder 16, having rotatably mounted shaft 18 extending therefrom, produces electrical impulses in unique combinations, each representative, in binary digital impulse code, of a discrete angular disposition of shaft 18. An example of a suitable encoder is a C-711 encoder sold by Datex Corporation of Monrovia, California and described in its bulletin No. 312–1, issued September 20, 1959. Secured to the end of shaft 18 is reel 20, on which elongated flexible member 22 is wound such that shaft 18 is rotated within encoder 16 when member 22 is pulled from reel 20 or allowed to rewind on it. Although member 22 is illustrated as a tape, such as a metallic or fabric tape, it can also be a wire. Shaft 18 is biased toward a zero rotational position with respect to encoder 16 by spring 24 secured to encoder 16 and reel 20. Spring 24 also biases shaft 18 to maintain tape 22 wound on reel 20.

Small measurement digitizer 10 preferably includes means to guide the movement of tape 22 in a direction substantially tangential to reel 20 and in a plane parallel to the surface on which the measurements are to be made, especially when relatively long distances are being measured. The illustrated guide for tape 22 consists of rigid rods 26 which extend from base 12 in a direction substantially parallel to the surface on which the measurements are to be made and pass through apertures in indexing member 28 secured to the end of tape 22. The apertures in member 28 are slightly larger than rods 26 so that member 28 is freely slidable along rods 26. Rods 26 are preferably removable so that they can be replaced with shorter or longer rods if desired. Member 28 is provided with knob 30, to aid one in sliding it along rods 26, and index 32, which is adjacent to index 34 on base 12 when tape 22 is fully wound.

Encoder 16 is connected by lead wires 36 to apparatus for translating digital data and indicating and/or recording the measurements made. Illustrative of such apparatus, encoder 16 is connected by lead wires 36 to translator 38, designed to acquire the binary digital data, translate it into decimal digital data, and store it. Such a translator is a K–154–3 control chassis sold by Datex Corporation. Translator 38 is connected by lead wires 40 to junction box 42 which, in turn, is connected by lead wires 44 to an output unit 46 adapted to record the decimal number on a punch card, paper tape, magnetic tape, etc. Output unit 46 is energized by hand- or foot-operated switch 48, connected to junction box 42 by lead wires 50. If desired, the apparatus can include means for manually imprinting identification information on the recorded record, such as keyboard 52 connected to output unit 46 by lead wire 54. Examples of suitable equipment are Datex Corporation J–113–34 junction box for junction box 42 and IBM 526 punch as output unit 46 and keyboard 52.

In using the apparatus illustrated in FIGURES 1 and 2, digitizer 10 is positioned such the zero index 34 on base 12 is placed on one extremity of the distance to be measured and tape 22 will be unwound from reel 20 toward the other extremity of the distance to be measured. Tape 22 is unwound from reel 20 so that the distance between indexes 32 and 34 matches the distance to be measured. The unwinding of tape 22 sends a binary digit signal from encoder 16 to translator 38 which translates the binary digit signal into a decimal digit signal. Output mechanism 46 is then actuated by means of switch 48 to record the measurement on a punch card, etc. If desired, identification information can be imprinted on the record by means of keyboard 52 before switch 48 is actuated. Then, measuring device 10 is moved to another object and the measuring and recording steps are repeated, and the procedure is repeated for as many distances as need be measured. It will be apparent that the measurements made by our invention may include distances between two points on an object or magnified image of an object, peak heights on graphs, or any other distances ordinarily measured by a caliper.

Figure 3:
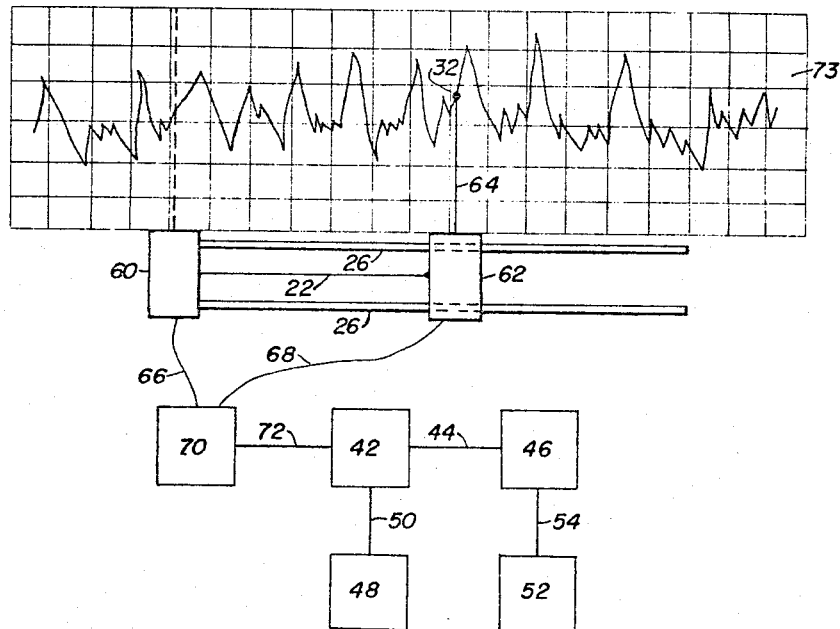
FIGURE 3 is a diagrammatic view of the X–Y reader in use in connection with a schematic circuit diagram of apparatus for recording the measurements made.

An embodiment of our invention adapted for making measurements in both the "X" and "Y" directions on a graph or chart is shown diagrammatically in FIGURE 3. This embodiment includes two of the devices described in relation to FIGURES 1 and 2 to permit measurement in two directions, one direction being perpendicular to the other. Referring to FIGURE 3, encoder-reel assembly 60 is similar to measuring device 10 illustrated in FIGURES 1 and 2 except that second encoder-reel assembly 62, which is also similar to measuring device 10 illustrated in FIGURES 1 and 2, is secured to tape 22 and slidably mounted on guide rods 26. Guide rods 26 extend from encoder-reel assembly 60 in a direction tangential to reel 20 (FIGURE 1) and in a plane parallel to the surface on which the measurements are to be made. Encoder-reel assembly 62 is so constructed that tape or wire 64 thereof is unwound in a direction perpendicular to the direction in which tape 22 is unwound. That is, tape or wire 64 is extended from encoder-reel assembly 62 in the "Y" direction relative to the "X" direction of guide rods 26. Encoder-reel assembly 62 may also be provided with guide rods for tape or wire 64.

If desired, the X–Y reader may be provided with means for adjusting the "zero" position of index point 32 (FIGURE 3) of assembly 62 to different points. For example, the entire X–Y reader may be mounted on a base such that it is reciprocally movable in a plane parallel to the plane in which tape or wire 64 is extendable. Such a modification would be especially beneficial where measurements are made on two or more curves having different datum lines on the same chart, or the base line of a single curve is not a straight line.

The binary digital outputs of the encoders in assemblies 60 and 62 may be fed to the same or separate apparatus for translating the outputs into decimal numbers and indicating and/or recording measurements made. For example, the outputs of each of the encoders may be fed to a translating and recording circuit as depicted in FIGURE 1. Preferably, the encoders in assembly 60 and 62 are connected by lead wires 66 and 68, respectively, to dual-channel ("X" and "Y") translator 70. Dual-channel translator 70 is connected by lead wire 72 to junction box 42 which, in turn, is connected by lead wire 44 to output unit 46. Output unit 46 is actuated by switch 48 connected by lead wire 50 to junction box 42. Optionally, keyboard 52 is connected to output unit 46 by lead wire 54 to place identification information on the card or tape simultaneously with the measurement information.

In using the apparatus, chart or graph 73 is positioned with its base line coincident with the "zero" position of assembly 62 and parallel to rods 26, and with a reference line coincident with the "zero" point of assembly 60 and perpendicular to rods 26. Then, assembly 62 is moved along rods 26 to a point directly beneath the graph point to be recorded, thereby unreeling tape 22 from encoder 60 and creating an output from encoder 60 to translator 70. Then, tape or wire 64 is extended until the index point thereon reaches the point to be measured. The unwinding of tape or wire 64 of assembly 62 results in the encoder thereof producing a signal which is transmitted to translator 70. Next, identification information is fed into output unit 46 by means of keyboard 52, and switch 48 is actuated to cause unit 46 to punch or otherwise create a record on a card or tape.

The polar coordinate map reader comprises a small measurement digitizer, mounted to be rotated about a vertical axis, and a second binary digital encoder adapted to produce an electrical signal indicative of the angular position of the small measurement digitizer. The polar coordinate map reader of our invention is superior to devices which have been heretofore available in that it requires only one handed operation to obtain the basic coordinate data, the measuring head exclusive of associated electronic and recording equipment is small and readily portable, it is extremely easy to use, and the simple single extension of the tape or wire from the origin to the map point is sufficient to obtain the two-coordinate data.

Figure 5:
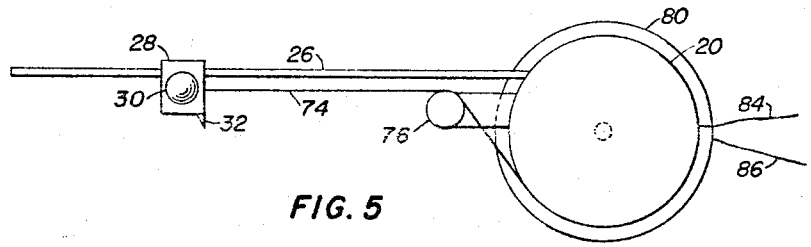
FIGURE 5 is a plan view of the polar coordinate map reader shown in FIGURE 4.
Figure 4:
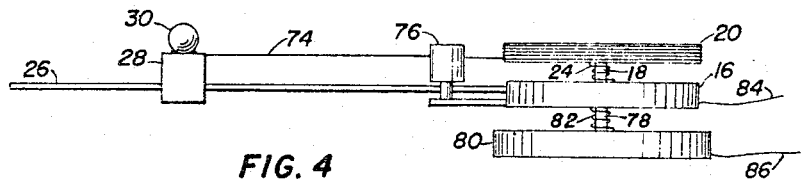
FIGURE 4 is a side view of the polar coordinate map reader.

The polar coordinate map reader illustrated in FIGURES 4 and 5 includes an encoder-reel assembly similar to the small measurement digitizer of FIGURES 1 and 2, except that it is shown in an alternative embodiment. Referring to FIGURES 4 and 5, in the encoder-reel assembly binary digital encoder 16 is horizontal, that is, in a plane parallel to the surface on which measurements are to be made, rather than perpendicular to the surface shown in FIGURES 1 and 2. Encoder 16 includes rotatable shaft 18, which is perpendicular to the surface on which measurements are to be made, and produces electric signals indicative of the angular position of shaft 18 in terms of binary digital quantities. Shaft 18 is biased in a zero position with respect to encoder 16 by spring 24. Secured to shaft 18 is reel 20 on which wire 74 is wound. Wire 74 is so wound on reel 20 that shaft 18 is rotated within encoder 16 when wire 74 is pulled from reel 20 or allowed to rewind on it.

Secured to encoder 16 is rigid rod 26, which is preferably removable so it can be replaced with rods of varying lengths. Slidably movable along rod 26 is indexing member 28 secured to the end of wire 74. Indexing member 28 is provided with knob 30 and index point 32. Binary digital encoder 16 is preferably provided with wire guide 76 to guide wire 74 in a straight path parallel to rod 26.

Encoder 16 is secured to rotatable shaft 78 of second binary digital encoder 80, shaft 78 being perpendicular to the surface on which the measurements are to be made. Shaft 78 is biased in the zero position with respect to encoder 80 by spring 82. The polar coordinate map reader is constructed such that indexing point 32 travels along a straight line passing through the center of shaft 78. It will be evident that binary digital encoder 80 will produce electric signals representing the angular disposition of indexing point 32. Encoders 16 and 80 are connected by lead wires 84 and 86, respectively, to suitable apparatus for translating the binary digital code into decimal numbers and indicating and/or recording same.

In using the polar coordinate map reader for the measurement of locations and data at locations on a map, the map is preferably mounted on a board with encoder 80 located at some position on the edge of the map or within the area of the map. The center point of encoder 80 defines the origin from which the length measurements are to be made and a selected diameter of encoder 80 defines the base line from which the angle measurements are made. Indexing member 28 is pulled out to position, bringing index point 32 to a selected point on the map. In the process, wire 74 will be extended from reel 20 equal to the distance from the origin to the selected point less the distance between the center of encoder 80 and zero position of point 32, and rod 26 will be rotated through an angle equal to the angle between the base line and the wire 74-line to the point. The map reader is programmed, as by adjusting encoder 80 or the associated electronic equipment, to compensate for constant distance between the zero position of index 32 and the map origin. The movement of indexing head 28 along rod 26 and the angular movement of rod 26 sends binary digit signals from encoders 16 and 80, respectively, to the apparatus for translating of the digital signals into corresponding decimal number signals, and indicating and/or recording of the decimal number signals.

Although this invention has been described in relation to specific embodiments, it will be apparent that modifications can be made by one skilled in the art without departing from the intended scope of this invention. For example, the small-measurement digitizer and the X–Y reader described in relation to FIGURES 1, 2 and 3 may have the axes of the encoder-reel assemblies in a position perpendicular to the surface on which measurements are to be made, and/or a wire may be used in lieu of the tape, as illustrated in FIGURES 4 and 5. On the other hand, the encoder-reel assembly of FIGURES 4 and 5 may have an axis in a plane parallel to the plane of the surface on which measurements are to be made, and/or a tape in lieu of the wire, as illustrated in FIGURES 1 and 2. The reel-and-tape or -wire arrangement may be substituted with other means for rotating the shaft of the binary digital encoder as the indexing point is moved, such as having the indexing point on an end of a rack which engages a pinion operatively connected to the rotatable shaft of the encoder. Another arrangement would have member 28 (FIGURES 1 and 2) rigidly affixed to the end of rods 26 (instead of sliding thereon) and rods 26 slidable through apertures in base 12. Then, additional lengths of rods 26 can be added to the rear ends of rods 26 as needed, instead of only on the front end of base 12 as hereinbefore described.

The embodiments of this invention in which an exclusive property or privilege is claimed are defined as follows:

1. A measuring device comprising an elongated flexible member wound on a rotatably mounted carrier and adapted to be extended from said carrier, the extension of said flexible member from said carrier causing said carrier to rotate, electrical signal-producing means responsive to movement of said flexible member and adapted to produce a plurality of electrical signals as binary digital quantities, each of said signals being indicative of a discrete distance said flexible member is extended from said carrier, and indicating means electrically connected to said signal-producing means to indicate the output of same.

2. A measuring device in accordance with claim 1 in which said signal-producing means is mechanically connected to said carrier.

3. A measuring device in accordance with claim 2 in which said signal-producing means includes a rotatably mounted shaft extending therefrom and is adapted to produce electrical signals indicative of angular positions of said shaft, and said shaft is mechanically connected to said carrier.

4. A measuring device in accordance with claim 3 in which said indicating means converts said binary digital quantities to decimal numbers and indicates said decimal numbers.

5. A measuring device in accordance with claim 4 in which said shaft is biased to maintain said flexible member wound on said carrier.

6. A measuring device in accordance with claim 5 which includes guide means to guide the movement of said flexible member in a substantially linear, tangential path from said carrier.

7. A measuring device in accordance with claim 6 which includes a stationary indicium and an indicium on said flexible member, said indicia being adjacent to one another when said flexible member is fully wound on said carrier.

8. A measuring device in accordance with claim 6 which includes a second measuring device physically connected to said flexible member, thereby being adapted to be extended from said first measuring device as said flexible member is extended from said carrier, said second measuring device comprising a second elongated flexible member wound on a second rotatably mounted carrier and adapted to be extended from said second-named carrier in a direction substantially perpendicular to the direction said first-named flexible member is adapted to be extended from said first-named carrier, the extension of said second-named flexible member from second-named carrier causing said second-named carrier to rotate, second signal-producing means responsive to the movement of said second-named flexible member and adapted to produce a plurality of electrical signals, each of said second-named signals being indicative of a discrete distance said second-named flexible member is extended from said second-named carrier, and second indicating means electrically connected to said second-named signal producing means to indicate the output of same.

9. A measuring device in accordance with claim 8 in which said second-named signal-producing means is mechanically connected to said second-named carrier.

10. A measuring device in accordance with claim 9 in which said second-named signal-producing means includes a rotatably mounted shaft extending therefrom and is adapted to produce electrical signals indicative of the angular position of said second-named shaft, and said second-named shaft is mechanically connected to said second-named carrier.

11. A measuring device in accordance with claim 10 in which said second-named signal-producing means produces electrical signals as binary digital quantities and said second-named indicating means converts said second-named digital quantities to decimal numbers.

12. A measuring device in accordance with claim 6 in which said flexible member includes an indicium, said flexible member and guide means are adapted to be rotated about an axis substantially perpendicular to the direction said flexible member is adapted to be extended from said carrier, said guide means being adapted to guide said flexible member such that said indicium moves in a substantially straight line traversing said axis, and a second signal-producing means responsive to the movement of said guide means is adapted to produce a plurality of electrical signals, each of said second-named signals being indicative of a discrete angular position of said guide means, said second-named signal producing means being electrically connected to indicating means adapted to indicate the output of same.

13. A measuring device in accordance with claim 12 in which said second-named signal producing means includes a rotatably mounted shaft extending therefrom and is adapted to produce electrical signals indicative of angular positions of said shaft, and said second-named shaft is mechanically connected to said guide means and coaxial with said axis.

14. A measuring device in accordance with claim 13 in which said second-named signal producing means produces electrical signals as binary digital quantities and said second-named indicating means converts said second-named binary digital quantities to decimal numbers.

15. A measuring device comprising a body member, an elongated member adapted to be extended from said body member, a binary digital encoder responsive to the movement of said elongated member and adapted to produce a plurality of electrical signals as binary digital quantities, each of said signals being indicative of a discrete distance said elongated member is extended from said body member, and indicating means electrically connected to said binary digital encoder and adapted to convert said binary digital quantities to decimal numbers and indicate said decimal numbers.

16. A measuring device in accordance with claim 15 which includes a second measuring device physically connected to said elongated member, thereby being adapted to be extended from said body member as said elongated member is extended from said body member, said second measuring device comprising a second body member, a second elongated member adapted to be extended from said second body member in a direction substantially perpendicular to the direction said first-named elongated member is adapted to be extended from said first-named body member, a second binary digital encoder responsive to the movement of said second-named elongated member and adapted to produce a plurality of electrical signals as binary digital quantities, each of said second-named signals being indicative of a discrete distance said second-named elongated member is extended from said second-named body member, and second indicating means electrically connected to said second-named binary digital encoder, said second-named indicating means being adapted to convert said second-named binary digital quantities to decimal numbers and indicate said second-named decimal numbers.

17. A measuring device in accordance with claim 16 in which said first-named and second-named indicating means are the same.

18. A measuring device in accordance with claim 15 in which said body member includes guide means to guide the movement of elongated member in a substantially straight path from said body member.

19. A measuring device in accordance with claim 18 in which said elongated member includes an indicium, said elongated member and guide means being adapted to be rotated about an axis substantially perpendicular to the direction said elongated member is adapted to be extended from said body member such that said indicium is adapted to be extended from said body member in a straight line traversing said axis, a second binary digital encoder responsive to the angular movement of said elongated member and guide means is adapted to produce a plurality of electrical signals as binary digital quantities, each of said second-named signals being indicative of a discrete angular position of said elongated member and guide means, and second indicating means is electrically connected to said second-named binary digital encoder, said indicating means being adapted to convert said second-named binary digital quantities to decimal numbers and indicate said second-named decimal numbers.

20. A measuring device in accordance with claim 19 in which said first-named and second-named indicating means are the same.

References Cited by the Examiner

UNITED STATES PATENTS 2,546,155   3/1951   Haber _____ 33—139
2,603,688   7/1952   Cole _____ 235—92

MALCOLM A. MORRISON, *Primary Examiner.*

K. W. DOBYNS, *Assistant Examiner.*